Nov. 27, 1962

J. O. BROWN 3,065,880

ALLOWABLE COUNTER

Filed Aug. 13, 1959

*Fig. 1.*

*Fig. 2.*

INVENTOR.
JAMES O. BROWN
BY
*Arthur L Wade*

ATTORNEY

United States Patent Office 3,065,880
Patented Nov. 27, 1962

3,065,880
ALLOWABLE COUNTER
James O. Brown, Tulsa, Okla., assignor to National Tank Company, Tulsa, Okla., a corporation of Nevada
Filed Aug. 13, 1959, Ser. No. 833,520
5 Claims. (Cl. 222—17)

The present invention relates to a control system for lease automatic custody transfer apparatus. More specifically, the invention relates to the control of the lease automatic custody transfer system with which the amount of oil is passed through the system is limited to a predetermined amount.

Lease automatic custody transfer systems of many types have been developed during recent years. These systems automatically deliver oil from a producing oil well to the pipeline of a consumer. Conservation, and other reasons, have restricted the production and sale of this transferred oil.

A lease automatic custody transfer system can be stopped in various ways after it has delivered a predetermined amount of oil. However, where the control system is powered by fluid pressure, no means is available to control such fluid pressure powered control system with an impulse of fluid pressure developed from the amount of oil delivered as an index.

An important object of the present invention is to establish a fluid pressure control signal after a predetermined number of events has occurred which can be used to halt the occurrence of the events.

Another object of the invention is to actuate a fluid pressure transmitter after a certain number of index impulses has been received by the transmitter and de-energize the source of the index impulses with the output of the fluid pressure transmitter.

Another object is to move a cam with index impulses until the cam is positioned so as to actuate a fluid pressure transmitter and thereby initiate control action which prevents the development of more index impulses.

Another object is to stop the metering of oil by a lease automatic custody transfer system powered by fluid pressure with a control fluid pressure after a predetermined amount of oil has been transferred from the producing well to the consuming pipeline.

The present invention contemplates a fluid pressure control system regulating a periodic number of controllable events. After a predetermined number of the events has occurred, a transmitter is actuated to establish a fluid pressure signal on the control system to halt further events occurring.

The present invention contemplates the transmitter as, essentially, a very simple valve supplied with a source of fluid pressure and actuated by a cam to establish a halting signal for the control system. The cam is positioned by a mechanism responsive to the events to actuate the cam to establish the halting signal after the predetermined number of events has occurred.

The invention further contemplates a lease automatic custody transfer system which dumps measured volumes of oil to the pipeline of a consumer. The transfer system is controlled by a fluid pressure control system which alternately isolates a fixed volume of merchantable oil and dumps the oil into a pipeline for the purchaser. A fluid pressure transmitter is actuated each time a dump of oil is made, however, no output fluid pressure control impulse is established by the transmitter until after a predetermined number of dumps has been made. The control impulse which is established after the predetermined number of dumps is placed on the fluid pressure control system of the transfer system in such manner as to stop operation of the control system and delivery of oil to the pipeline. The system remains shut-down until manual action is taken, or until some automatic mechanism resets the fluid pressure transmitter.

Other objects, advantages and features of this invention will become apparent to one skilled in the art upon consideration of the written specification, appended claims, and attached drawings, wherein FIG. 1 is a somewhat diagrammatic representation of a segment of a control system of a lease automatic custody transfer system in which the present invention is embodied; and FIG. 2 is a diagrammatic representation of the essential structure of the allowable counter of FIG. 1 in which the present invention is embodied.

*The General Lease Automatic Custody Transfer System*

Referring to FIG. 1, in order to illustrate the utility of the present invention, a portion of a complete system of lease automatic custody transfer is illustrated. The upstream conventional treating facilities for oil, gas and water must be visualized. Further, a depository for the clean oil produced by a treater must be visualized. From the depository, or working tank, the clean oil is taken into the custody meter illustrated in FIG. 1. Also, a pipeline surge tank for the clean oil passed through the meter is indicated. The product accumulated in the surge tank is delivered to a downstream pipeline not illustrated.

Conduit 5 directs the clean oil of the working tank into custody meter 6. Filling and dumping of meter 6 delivers the clean oil into pipeline surge tank 7. The clean oil metered into surge tank 7 therefrom into a pipeline.

It is appreciated that a complete control system for a complete lease automatic custody transfer apparatus can include much more than is illustrated in FIG. 1. A complete control system may modulate a valve controlling the output of the treater. The level of treated oil deposited in the working tank may be controlled between predetermined values. The percent and location of bottom sediment and water in the oil of the working tank can be detected and the liquids drawn off under the direction of a monitor. These, and other control systems, are important to the over-all operation of the lease automatic custody transfer system disclosed partially in FIG. 1. However, the present invention can be adequately disclosed with only general reference to such features.

The present invention is closely associated with the metering system specifically directed to the control of custody meter 6. As illustrated in FIG. 1, meter 6 is operated through filling and emptying periods which comprise a complete metering cycle. Three valves are controlled to basically operate the meter. Fill valve 15, in conduit 5, controls the introduction of oil to be metered from the working tank into custody meter 6. Topping valve 16 is kept open during the filling period of the cycle until the valve is flooded. When the flooding of valve 16 is detected, both fill valve 15 and topping valve 16 are closed. The exact, positive, volume of the custody meter 6 is then isolated between the seats of fill valve 15, topping valve 16 and bottom valve 17. The lower, discharge, valve 17 is then opened, and the unit of liquid counted and delivered to pipeline surge tank 7. Essential elements of the present invention are embodied in apparatus actuated by the control system for these valves.

A basic characteristic of this type of custody meter is that it is controlled from bottom valve 17, with a sensing means downstream of the bottom valve to develop the signal representative of the end of each cycle of a filling period and a dumping period. More specifically, a reservoir, or volume chamber, with a float therein, represents one of the many possible primary elements for responding to the major portion of the liquid which passes through the float chamber downstream of bottom valve 17. If reservoir chamber 18 passes the dump liquid of valve 17 at substantially the same rate it receives dumped liquid, float 19 will develop a signal for the control system of valve 17 as soon as the major portion of oil from meter 6 passes valve 17 and through float chamber 18. Float 19 will then drop and signal valve 17 to close, while a finite amount of clingage remains on the walls of the metering vessel 6.

Chamber 18 is provided with means for retaining enough of the dumped liquid beneath float 19 to keep it buoyed against developing a signal representative of the cycle completion. Drain line 20 is communicated with the bottom of reservoir 18, and the rate of drain through line 20 is established by the capacity of valve 21.

A control system is provided to operate the valves of FIG. 1 so that valve 21 will be opened at the same time dump valve 17 is opened. Drain through valve 21 will be at the rate which will retain the buoying liquid under float 19 for the period of time determined to insure a desired amount of clingage will pass bottom valve 17. Further, valve 21 is arranged to respond to the control system so that if a general power failure causes bottom valve 17 to fail-shut, valve 21 will simultaneously close. Power failure closure of valve 21, during the period of dumping custody meter 6, will trap enough dumped liquid in reservoir 18 to maintain float 19 buoyed and prevent development of the end-of-the-cycle signal. As float 19 is not permitted to drop, the integrator of the number of custody meter dumps will not be actuated, and the resumption of power of the control system will result in the metering being continued and at the conditions which existed when the power failure occurred.

Control System

The control system of FIG. 1 is shown developing its specific power impulses from an available fluid pressure supply. However, an electric control system for accomplishing the same result is obviously feasible.

The fluid pressure supply is normally expected to be a single source. However, to reduce the complication of illustrating complex piping from a single source, individual indications of supply are shown at each component of the system. This convention is used with the understanding that the supply could be from a single air compressor, or the supply could be vapor from a separator or treater, suitably filtered and regulated to a desired range of pressure.

The primary elements which develop the control impulses for the system are bottom float 19 and top float 25. These floats are representative of means which can develop control signals representative of the levels of liquid in chamber 18 and chamber 26. When liquid is sensed in chamber 26, topping valve 16 is flooded, i.e. liquid has risen above it. When the liquid of chamber 18 falls low enough to lower float 19, the cycle containing a filling period and a dumping period has been completed.

The four-way switching pilot valve 27 centralizes the action of the control system. Pilot valve 27 is supplied from the common source of fluid pressure to alternately open dump valve 17 while closing topping valve 16 under the direction of floats 19 and 25. Topping valve 16, in turn, establishes a fluid pressure control impulse to open fill valve 15 when topping valve 16 has been opened and to close fill valve 15 when topping valve 16 has been closed. Therefore, topping valve 16 and fill valve 15 are opened and closed together and alternately with dump valve 17.

Basic Metering Function

The basic sequence of operation can be readily traced in FIG. 1. Bottom valve 17 is shown open, dumping the contents of meter 6 through conduit 28, reservoir 18 and into pipeline surge tank 7. Float 25 is shown up, having developed the fluid pressure impulse to apply to actuator 29 and shift the stem of pilot 27 to connect pipe 30 to the supply.

Pipe 30 is communicated to dump valve 17, opening the valve as shown. Note is made of the routing of pipe 30 through interlock valve 31 on fill valve 15. Because of interlock valve 31, dump valve 17 can only be opened when fill valve 15, and topping valve 16, are both closed. Pipe 32 branches from pipe 30 to open valve 21 from the pipe 30 impulse.

Float 19 is shown up, the dumped liquid overflowing reservoir 18 is buoying float 19. The dumped liquid is also draining through conduit 20, valve 21 having been opened by the impulse of pipe 30. As the major portion of dumped liquid is drained from meter tank 6, through valve 17 and through chamber 18, the portion retained by reservoir 18 will drain through conduit 20 and valve 21 to lower float 19, in a time established by the capacity of conduit 20 and valve 21. This time is fixed to drain the clingage of meter 6 down to an amount which will not reduce the accuracy of the meter below predetermined limits.

When float 19 finally does lower, it develops a fluid pressure control signal from the supply pressure, representative of the cycle completion. This signal is applied to actuator 33, shifting the shuttle pilot valve 27 to connect pipe 34 to supply and exhaust pipe 30. Exhausting pipe 30 closes dump valve 17. Interlock valve 37 opens pipe 34 between pilot valve 27 and fill valve 16. Pressuring pipe 34 from supply then opens topping valve 16. Valve 16, opened by the control signal in pipe 30, actuates transmitter 35 to develop the control signal in pipe 36 which opens fill valve 15. The meter 6 then goes into its filling period. Note that interlock valve 37 in pipe 34 is controlled by dump valve 17 in order that topping valve 16 and fill valve 15 can both open only when dump valve 17 is closed.

A commercially available switching pilot valve mechanism which will function as required for pilot valve 27 is manufactured by Garrett Oil Tools, Division U.S. Industries, Incorporated, Longview, Texas, and designated as a Type "E" shuttle valve. The valving between supply pressure, exhaust, pipe 30 and pipe 34 is disclosed diagrammatically, actuated between its two positions by actuators 29 and 33. Actuator 29 responds to the upper float 25 fluid pressure control impulse, and actuator 33 responds to the lower float fluid pressure control impulse 19. Each actuator is spring-returned from actuating the shuttled valve stem. Further, the valve stem may be shuttled with the control impulse of one actuator whether or not the other control impulse has been removed from the other actuator.

After topping valve 16 is opened by the fluid pressure in pipe 34, the liquid in chamber 26 drains into meter 6. Float 25 lowers and the fluid pressure control impulse is removed from actuator 29. Actuator 29 resets under the force of a spring, ready to shift the stem of valve 27 when another control impulse is received from float 25. When float 25 raises, the stem is shifted in valve 27 and the dumping period begins.

The Present Problem

As disclosed in FIG. 1, the metering system will continue to automatically receive liquid from conduit 5 and deliver the liquid to tank 7. However, many factors often limit the amount of oil produced and metered. After a predetermined quantity has been produced and metered the control system must be shut down and the metering operation stopped. The control system disclosed in FIG. 1 operates with the power in the fluid pressure supply. In a large majority of the cases, this type of power is the most readily available, and preferred. The present problem in its broadest sense, is the interruption of the automatic action of this control system powered by fluid pressure. Therefore, a means is required to respond to a control impulse of fluid pressure which is developed when the amount of oil delivered by meter 6 reaches a predetermined limit.

General Solution

A fluid pressure of the system of FIG. 1 is selected as representative of the number of dumps made by meter 6. After a predetermined number of dumping events has occurred, the fluid pressure impulse causes a transmitter to establish a fluid pressure control signal on the metering system to stop further dumps from occurring.

In principle, the transmitter is a simple fluid pressure-supplied valve actuated by a cam which responds to the impulses of the metering system which are representative of the number of dumping events to be permitted to occur.

Specific Solution of Problem

An allowable transmitter counter 40 is shown being impulsed from pipe 30 through branch pipe 41. After a predetermined number of impulses have occurred in pipes 30 and 41, allowable transmitter counter 40 establishes a fluid pressure impulse in pipe 42. Pipe 42 actuates blocking valve 43, in pipe 36. The impulse of pipe 36 is thereby isolated from fill valve 15 until transmitter counter 40 is manually reset.

Referring now to FIG. 2, the essential elements of the mechanism within transmitter counter 40 are illustrated, somewhat diagrammatically. Pipe 41 is shown bringing the impulse of pipe 30 into transmitter diaphragm housing 45. Transmitter diaphragm 46 receives the pipe 30—41 impulses to travel downwardly against the force of return spring 47. As the fluid pressure in pipes 30 and 41 varies between atmospheric pressure and supply pressure, transmitter diaphragm 46 is vertically reciprocated to move rod 48.

Rod 48 is reciprocated in order to continuously advance cam 49. In general, a ratchet mechanism is required between rod 48 and cam 49 in order to convert the reciprocating motion of rod 48 into the rotary motion of cam 49.

To give the simplest illustration of the required ratchet mechanism, cam 49 and solid toothed plate 50 are illustrated as attached together and rotating about common center 51. The teeth of plate 50 are turned beneath the vertical path of rod 48. A resilient contact finger 52 is illustrated as attached to the bottom end of rod 48. Finger 52 is long enough to rotate each tooth down to the position shown for tooth 53. In rotating tooth 53 to the position illustrated, tooth 54 is rotated into alignment with the vertical axis of rod 48. As contact finger 52 is drawn upward it snaps back into alignment with the axis of rod 48, after clearing tooth 54, so that the next downward motion will cause it to engage tooth 54 and carry it to the position illustrated for tooth 53. Obviously, saw-toothed plate 50 and attached cam 49 will be rotated clockwise.

The profile of cam 49 is a circle about pivot point 51 with the exception of a notch-gap 55. When notch 55 is rotated to a predetermined position, lever 56 is pivoted to bring flapper member 57 against nozzle 58. Output pipe 42 is illustrated as being supplied through an orifice 59. The supply through orifice 59 will be bled from nozzle 58 until nozzle 58 is covered by flapper 57. Covering nozzle 58 by flapper 57 will develop a back pressure in pipe 42 sufficient to actuate blocking valve 43 to halt the automatic metering of the system in FIG. 1.

Lever 56 is pivoted about point 60 to carry flapper 57 into engagement with nozzle 58. Roller 61 rides along the surface of cam 49 until it enters notch-gap 55. Spring 62 constantly urges the rotation of lever 56 counterclockwise. When roller 61 enters notch 55, counterwise rotation of lever 56 about pivot point 60 results with the consequent development of the transmitter output fluid pressure in pipe 42.

Cam 49 and plate 50 can be manually rotated by shaft 63. A cumulative counter 64 is actuated with shaft 63. Therefore, counter 64, cam 49 and plate 50 can be rotated to a predetermined position by manual manipulation of knob 65. The predetermined position of notch-gap 55 will be such that a stipulated number of impulses from pipe 30 will advance notch-gap 55 to the position where roller 61 will enter notch-gap 55 and bring flapper 57 against nozzle 58. Coordination between counter 64 readings and notch-gap 55 is readily obtained.

Conclusion

The structure illustrated in FIG. 2 may take many variations and still maintain the principles under which the present invention functions. Essentially, there is provided a simple transmitter valve which is actuated by a cam to develop a fluid pressure which will stop the automatic operation of the control system. The problem of taking fluid pressure impulses, representative of the amount of oil delivered by a lease automatic custody transfer system, and converting them into mechanical motion which can be calibrated and transduced into a transmitter fluid pressure signal representative of a cumulative amount of metered oil is met by this structure. Obviously, automatic resetting of this allowable transmitter counter structure is feasible. However, to avoid obscuring the fundamental concept of the invention, manual manipulation, to reset the structure, is illustrated.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. A metering system including,
   a vessel adapted to receive and dump equal increments of liquid,
   valves connected to the vessel to control the reception and dumping of the equal increments of liquid by the vessel,
   an operator for each vessel valve responsive to a fluid pressure to actuate the vessel valves to their open position,
   a control system connected to the operators of the vessel valves and producing a series of fluid pressure pulses with which to actuate the vessel valves to carry out automatic filling and dumping of equal increments of liquid by the vessel,
   a transmitter valve with which a stopping fluid pressure is developed and applied to stop the fluid pressure pulses of the control system and thereby halt the actuation of the vessel valves and the automatic filling and dumping of the vessel,
   a transmitter diaphragm operator responsive to the fluid pressure pulses of the control system,
   and linkage between the transmitter diaphragm operator and the transmitter valve with which the transmitter diaphragm operator mechanically actuates the transmitter valve to develop the stopping fluid pressure after the transmitter diaphragm operator has responded to a predetermined number of fluid pressure pulses of the control system.
2. A metering system including,
   a vessel adapted to receive and dump equal increments of liquid,
   valves connected to the vessel to control the reception and dumping of the equal increments of liquid by the vessel, a control system responsive to volumes of liquid received by the vessel producing a series of fluid pressure pulses with which to actuate the valves connected to the vessel to carry out automatic filling and dumping of equal increments of liquid by the vessel, a valve transmitter with which a stopping fluid pressure is developed and applied to stop the fluid pressure pulses of the control system and thereby halt the actuation of the vessel valves and the automatic filling and dumping of the vessel, a transmitter diaphragm operator responsive to the fluid pressure pulses of the control system, a cam rotated by the pulsed transmitter diaphragm operator, and a lever positioned by the cam after a predetermined degree of rotation of the cam by the transmitter diagram operator to position the transmitter valve and cause the transmitter valve to develop the stopping fluid pressure as an output which is then applied to stop the fluid pressure pulses of the control system.

3. A metering system including a vessel adapted to receive and dump equal increments of liquid, valves connected to the vessel to control the reception and dumping of the equal increments of liquid by the vessel, an operator for each vessel valve responsive to a fluid pressure to actuate the vessel valves to their open position, a control system connected to the operators of the vessel valves and producing a series of fluid pressure pulses with which to actuate the vessel valves to carry out automatic filling and dumping of equal increments of liquid by the vessel, a nozzle orifice-flapper transmitter valve actuated to control a supply of fluid pressure to develop a stopping fluid pressure which is applied so as to de-energize the control system and halt the actuation of the vessel valves by the pulses of the control system in their automatic filling and dumping of the vessel, a transmitter diaphragm operator responsive to the fluid pressure pulses of the control system, a cam rotated by the transmitter diaphragm operator, and a lever connected to the flapper and arranged to be positioned by the cam after the cam has been rotated a predetermined degree by the transmitter diaphragm operator to position the flapper connected to the lever relative the nozzle orifice to develop the stopping fluid pressure from the supply as an output which is then applied to stop the fluid pressure pulses of the control system.

4. A metering system including, a vessel adapted to receive and dump equal increments of liquid, valves connected to the vessel to control the reception and dumping of the equal increments of liquid by the vessel, an operator for each vessel valve responsive to a fluid pressure to actuate the vessel valves to their open position, a control system connected to the operators of the vessel valves and producing a series of fluid pressure pulses with which to actuate the vessel valves to carry out automatic filling and dumping of equal increments of liquid by the vessel, a nozzle orifice-flapper transmitter valve actuated to control a supply of fluid pressure to develop a stopping fluid pressure which is applied so as to de-energize the control system and halt the actuation of the vessel valves by the pulses of the control system in their automatic filling and dumping of the vessel, a transmitter diaphragm operator responsive to the fluid pressure pulses of the control system, a ratchet actuated by the transmitter diaphragm operator, a cam rotated by the ratchet, and a lever connected to the flapper and arranged to be positioned by the cam after the cam has been rotated a predetermined degree by the ratchet to position the flapper connected to the lever relative the nozzle orifice to develop the stopping fluid pressure from the supply as an output which is then applied to stop the fluid pressure pulses of the control system.

5. A metering system including, a vessel adapted to receive and dump equal increments of liquid, a fill valve connected to the vessel controlling the introduction of liquid into the vessel, a topping valve connected to the vessel to determine the exact and positive volume of liquid in the vessel isolated between the seats of the fill and topping valves, a discharge valve connected to the vessel controlling the removal of liquid from the vessel, an operator for each fill and topping and discharge valve responsive to a control fluid pressure which actuates the valves, a control system including the operator for each fill and topping and discharge valve for applying a series of fluid pressure pulses to the operators of the vessel valves and carry out automatic filling and dumping of equal increments of liquid by the vessel, a blocking valve in the control system which is positioned to stop the series of fluid pressure pulses from actuating the operators of the vessel valves and terminate the automatic filling and dumping, a transmitter valve with which a stopping fluid pressure is developed and applied to position the blocking valve to stop the pulses from actuating the vessel valves, a transmitter diaphragm operator responsive to the fluid pressure pulses of the control system, and linkage between the transmitter diaphragm operator and the transmitter valve with which the transmitter diaphragm operator mechanically actuates the transmitter valve to develop the stopping fluid pressure after the transmitter diaphragm operator has responded to a predetermined number of fluid pressure pulses of the control system.

References Cited in the file of this patent

UNITED STATES PATENTS

| | | |
|---|---|---|
| 1,357,361 | Stuber | Nov. 2, 1920 |
| 1,433,512 | Lossing | Oct. 24, 1922 |
| 1,901,178 | Malm | Mar. 14, 1933 |
| 2,079,027 | Myon | May 4, 1937 |
| 2,573,112 | Schneckenburger | Oct. 30, 1951 |
| 2,633,750 | Langstaff | Apr. 7, 1953 |
| 2,759,633 | Ross | Aug. 21, 1956 |

FOREIGN PATENTS

| | | |
|---|---|---|
| 620,353 | Germany | Dec. 3, 1935 |